United States Patent

Kim

[15] 3,672,160
[45] June 27, 1972

[54] SYSTEM FOR PRODUCING SUBSTANTIALLY POLLUTION-FREE HOT GAS UNDER PRESSURE FOR USE IN A PRIME MOVER

[72] Inventor: Dae Sik Kim, 23 Hearthstone Drive, Medfield, Mass. 02052

[22] Filed: May 20, 1971

[21] Appl. No.: 145,128

[52] U.S. Cl. ...................................60/13, 60/39.68, 60/281
[51] Int. Cl. ...........................................F02b 37/02
[58] Field of Search...................60/13, 11, 39.68, 39.13, 281; 62/6

[56] References Cited

UNITED STATES PATENTS

| | | | |
|---|---|---|---|
| 2,162,967 | 6/1939 | Pescara | 60/11 |
| 3,444,686 | 5/1969 | Knowles | 60/11 |
| 3,513,929 | 5/1970 | Kim | 60/13 |
| 3,007,302 | 11/1961 | Vincent | 60/13 |
| 3,237,421 | 3/1966 | Gifford | 62/6 |
| 2,277,471 | 3/1942 | Wydler | 60/11 |
| 2,086,553 | 7/1937 | Hazwarth | 60/11 |
| 1,024,079 | 4/1912 | Jennings | 60/39.68 |
| 3,549,278 | 12/1970 | Giddings | 62/6 |

FOREIGN PATENTS OR APPLICATIONS

| | | | |
|---|---|---|---|
| 236,646 | 7/1925 | Great Britain | 60/39.68 |
| 123,045 | 1/1947 | Australia | 60/39.13 |

Primary Examiner—Carlton R. Croyle
Assistant Examiner—Warren Olsen
Attorney—Roy J. Ott

[57] ABSTRACT

An extremely low polluting turbine-powered vehicle comprises in combination a supercharged internal combustion engine operating under fuel-rich conditions, an interburner for completing the combustion of unburned fuel in the exhaust gases from the internal combustion engine, a gas turbine for utilizing the exhaust gases from the interburner for powering the vehicle, an air compressor driven by the engine and turbine for providing air under pressure to the interburner, an air compressor driven by the engine and turbine for providing air under pressure for use by the internal combustion engine and by the interburner compressor, a gas reservoir for storing exhaust gas supplied from the interburner for later use in providing power to the turbine for the acceleration of the vehicle or initial operation thereof, and a heat exchange/storage device for abstracting heat from the exhaust gas supplied to the gas reservoir and for returning a substantial portion of this abstracted heat to the exhaust gas delivered from the gas reservoir to the gas turbine.

16 Claims, 2 Drawing Figures

PATENTED JUN 27 1972  3,672,160

D.S. Kim  INVENTOR

BY  Roy J. Ott  ATTORNEY

SYSTEM FOR PRODUCING SUBSTANTIALLY POLLUTION-FREE HOT GAS UNDER PRESSURE FOR USE IN A PRIME MOVER

BACKGROUND OF THE INVENTION

1. Field of the Invention

This invention relates to a method and apparatus for the production of substantially pollution-free hot gas under pressure for use in a prime mover. In another aspect, the invention is concerned with a gas turbine powered vehicle producing a substantially pollution-free exhaust gas. In a more specific aspect, the invention is concerned with an automobile powered by a gas turbine utilizing the exhaust gases from an internal combustion engine.

2. Description of the Prior Art

During the last 50 years the high compression ratio gasoline engines used in today's automobiles have been improved almost to the point of perfection. Their most desirable performance characteristics are a quick response to level of power and their low wt./H.P. ratio. However, when exhaust emission is considered, the widely variable operating characteristics which are essential to today's directly driven automobile power systems cause difficulties in the design of an optimum exhaust elimination system. To date, various methods for the reduction of exhaust pollutants have been tried. These include, for example, the use of a catalytic afterburner and some recycling of exhaust gases. However, the methods of eliminating pollutants tried to date decrease the driveability of the vehicle; that is, losses are experienced in some of the operating characteristics of the engine and power train.

In the last several years steps have been taken to curb the air pollution due to internal combustion engines. In response to the need for reducing pollution, automobile manufacturers have started installing the so-called "blow-by" devices in most of their models for recirculating and burning gases which escaped from the cylinders passed the pistons. Many of these gases are mainly hydrocarbons that earlier models vented into the atmosphere. However, exhaust pipe gases still remain as the major source of automobile emissions to the atmosphere. These gases include carbon monoxide, nitrogen oxides and hydrocarbons.

The problems encountered in attempting to eliminate exhaust pollution may be understood from the following brief discussion. The power train of the present car is basically a direct drive system and, hence, the operation of its engine must meet all driving conditions. This in turn introduces a tremendous transient variation in the gas flow rates through the engine, in the exhaust temperature and in the exhaust composition. Any device which is attached to to such an engine must also be effective under such widely varying conditions. For example, variation in air flow rate may easily be 20 to 50 fold between full throttle operation and idle with the time required for such change being on the order of one second. The difficulty of meeting such adverse requirements is manifested abundantly in the literature. It will also be appreciated that the present configuration of direct drive power trains requires inefficient part-throttle operation for the majority of the time and a large engine capacity (several hundreds of horsepower not being uncommon) which is rarely used or required.

Newer standards for motor vehicle air pollutants have been developed under the federal "Clean Air Act of 1970." In response to this, automobile manufacturers are attempting to provide the necessary controls over such emissions by various methods, such as the one cited above and other modifications of the engine. While work is also proceeding on new drives based on fuel cells, large capacity electric storage batteries, etc., it will be understood that these are still in the earliest stages of development. It must, therefore, be appreciated that the burning of highly refined fossil fuels still remains and will remain for many years to come at the heart of the motor vehicle industry.

In my U.S. Pat. No. 3,513,929, which is incorporated herein by express reference, is described a low-polluting engine and drive system which although producing low experimental pollution levels has been found to have a number of disadvantages which make it impractical for use as an automotive power plant. For example, the system described in U.S. Pat. No. 3,513,929, is relatively inefficient and costly due to the necessity for large storage volume, heavy insulation and high strength materials of construction. In addition, when wet air compressors are used, the air tends to be contaminated by the lubricants. Another difficulty associated with this prior art vehicle is the difficulty experienced in controlling and matching the component hardwares.

SUMMARY OF THE INVENTION

In accordance with the invention, a practical system for producing substantially pollution-free power gases for use in a prime mover, such as a gas turbine, is achieved by a combination including an internal combustion engine adapted to burn a fuel-rich fuel/air mixture, an interburner receiving the exhaust gases from the internal combustion engine for completing the combustion thereof in the presence of excess air, a gas reservoir for storing exhaust gas under pressure received from the interburner, a conduit positioned to supply the exhaust gas from the interburner to the gas reservoir and the prime mover and to supply stored gas from the gas reservoir to the prime mover, means for regulating the supply of exhaust gas to the prime mover, and a heat exchange/storage device for abstracting heat from the exhaust gas supplied to the gas reservoir from the interburner and for returning a substantial portion of the abstracted heat to the exhaust gas delivered from the gas reservoir to the prime mover.

In another aspect, the invention includes a gas turbine driven vehicle such as an automobile, bus, truck, boat, etc., including in combination an internal combustion engine for burning a fuel-rich fuel/air mixture, an interburner connected to the internal combustion engine for receiving the exhaust gases therefrom, a compressor for delivering compressed air to said interburner to effect combustion of the unburned fuel contained in the exhaust gases from the internal combustion engine, a gas reservoir for storing exhaust gas under pressure from the interburner for subsequent use by the gas turbine to derive power therefrom, a conduit positioned to permit the flow of exhaust gas from the interburner to the gas reservoir and to permit the flow of exhaust gas from the interburner and/or gas reservoir to the gas turbine, means for regulating the delivery of exhaust gas under pressure from the gas reservoir and the interburner to the gas turbine, and a heat exchange/storage device for abstracting heat from the exhaust gas supplied to the gas reservoir and for returning a substantial portion of the abstracted heat to the exhaust gas supplied to the gas turbine from the gas reservoir.

In a further embodiment, the gas turbine powered vehicle of the invention will include an internal combustion engine; a carburetor for supplying a desired amount of fuel and air under pressure to the internal combustion engine for the supercharging thereof; an interburner connected to the internal combustion engine for receiving the exhaust gases therefrom; a compressor for delivering compressed air to the interburner to effect combustion of the unburned fuel contained in the exhaust gases from the internal combustion engine, said compressor operatively connected to the internal combustion engine and the gas turbine so that power is derived therefrom; a precompressor for supplying compressed air to the carburetor and the compressor, said precompressor operatively connected to the internal combustion engine and the gas turbine so that power is derived therefrom; a gas reservoir for storing exhaust gas under pressure from the interburner and for supplying stored exhaust gas to the turbine; a conduit for permitting the flow of exhaust gas from the interburner to the gas reservoir and for permitting the flow of exhaust gas from the interburner and/or gas reservoir to the gas turbine; a heat exchange/storage device for abstracting heat from exhaust gas supplied to the gas reservoir and for returning a substantial portion of the abstracted heat to the exhaust gas supplied to the gas turbine from the gas reservoir; a manually operated means for regulating the delivery of exhaust gas under pressure from the gas reservoir and interburner to the gas turbine so that operation of the gas turbine, compressors and internal combustion engine is controlled thereby.

The system of this invention has the advantage that the gas stored in the gas reservoir may be utilized to supply exhaust gas under pressure to the gas turbine for the initial operation thereof, thereby actuating operation of the compressors and internal combustion engine. The stored exhaust gas can also be used to provide protection for the occupants of the vehicle by inflating a passive restraining device such as a gas bag in the event of collision of the vehicle. The maximum pressure attainable in the gas reservoir may be controlled by having the gas flow regulating means responsive to a predetermined pressure limit in the gas reservoir so that upon attainment of the pressure limit the delivery of exhaust gas to the gas turbine will be curtailed, which in turn, will curtail the operation of the compressors and internal combustion engine which are operatively associated therewith.

In operating the vehicle of this invention, a fuel-rich mixture of fuel and air is burned in an internal combustion engine to produce an exhaust gas having a low concentration of nitrogen oxides and containing unburned hydrocarbons and carbon monoxide. The air-to-fuel ratio in the fuel-rich mixture is adjusted to preferably produce an exhaust gas having a concentration of nitrogen oxide below about 500 ppm (parts per million), more preferably below 200 ppm. This may be achieved by utilizing in the internal combustion an air-to-fuel ratio ranging from about 8:1 to 13:1, preferably about 10:1 for a typical commercial gasoline. Preferably, the internal combustion engine will be supercharged in accordance with well known techniques and the pressure of the air delivered to the internal combustion engine will normally vary between atmospheric and 6 atmospheres.

The exhaust gas from the internal combustion engine is combusted in an interburner in the presence of excess air to produce a substantially pollution-free exhaust gas containing preferably less than 100 ppm of unburned hydrocarbons, more preferably less than 20 ppm of unburned hydrocarbons. Typically, the overall air-to-fuel ratio (based on total fuel and air entering the system) in the interburner will range from about 20:1 to 40:1, although slightly lower or higher ratios may be utilized. The air delivered to the interburner will be at a pressure sufficiently high to cause entry into the interburner. In general, the air supplied to the interburner will conveniently be less than about 16 atmospheres, usually less than about 14 atmospheres.

As indicated previously, the exhaust gas supplied to the gas reservoir is cooled prior to entry therein, thereby reducing the storage capacity required to store a given amount of exhaust gas. For an efficient system, it will be advantageous to cool the exhaust gas delivered to the gas storage tank to a temperature below about 250° F., preferably below about 100° F. When stored exhaust gas is transferred from the gas reservoir to the gas turbine, a substantial amount of the heat previously abstracted is returned to the exhaust gas prior to its delivery to the gas turbine. This alternate cooling and heating of exhaust gas supplied to and from the gas reservoir respectively, may be accomplished by contacting the hot exhaust gases from the interburner with a heat exchange/storage device which removes heat from the hot exhaust gases and stores a substantial amount of the thus removed heat which is then substantially returned to the cooled exhaust gas which is subsequently contacted therewith prior to its delivery to the gas turbine. The term "substantial" is employed herein to indicate that an effort is made to restrict the loss of heat from the heat exchange/storage device to its external environment. In this context, at least 50 percent of the heat abstracted from the hot exhaust gas delivered to the gas reservoir should be returned to the exhaust gas supplied to the turbine from the exhaust gas reservoir. However, for more effective operation, the amount of abstracted heat returned during normal operation to the exhaust gas delivered from the gas reservoir to the gas turbine will be greater than 75 percent, preferably greater than 90 percent.

The particular heat exhange/storage device for use herein may include a number of devices which can be readily designed by those skilled in the art. For example, the device may merely consist of an insulated pipe containing therein a high surface area solid ceramic material for contact with the hot or cooled exhaust gases passed therethrough.

In one embodiment, the invention may be considered as consisting of three functional subsystems generally referred to as a gas generator, a capacitive storage system and a power turbine/drive system. The gas generator system converts fresh air and fuel into a hot gas under pressure for supply to the other two subsystems. Combustion first under fuel-rich and then under fuel-lean conditions produces a working gas containing extremely low levels of nitrogen oxides, unburned hydrocarbons and carbon monoxide. Further improvement in pollution levels is achieved by the fact that all compressed air streams which may be contaminated with compressor lubricants are passed through an interburner where removal thereof occurs. Thus, the function of the gas generator system is to produce a clean exhaust gas at high pressure and temperature which is supplied at a controlled rate to a power turbine, with the remainder going to the capacitive energy storage system.

The capacitive energy storage system will generally include a heat exchange/storage device connected to an exhaust gas reservoir. The operation of the capacitive energy storage system may be described as follows. In a transient state where the demand suddenly drops, such as is the case in the decel-mode of an automobile, the supply of clean exhaust gas to the gas turbine is manually restricted to cause flow of the exhaust gas to the gas reservoir, thereby eliminating any sudden change in the operation of the compressors, internal combustion engine and interburner. Prior to entry of the exhaust gas into the gas reservoir, the gas is contacted with a heat exchange material having a high surface to volume ratio and a high heat capacity, e.g., a commercially available ceramic matrix sold by E. I. duPont de Nemours & Company under the trade name "Torvex Ceramic Honeycomb," to remove the sensible heat from the hot gas. As the gas passes through the heat exchange/storage device, the temperatures of the gas and heat exchange material will decrease and at some point moisture will probably start condensing from the gas. In the event that demand increases suddenly, as in an accel-mode of an automobile, less restriction is placed on the flow of exhaust gas to the gas turbine so that exhaust gas will flow from the gas reservoir to the gas turbine to provide instant power. Thus, the gas generator system need not supply all the peak demand. This scheme enables one to minimize the heat loss in storage, to eliminate or minimize the need for tank insulation, to increase the effective energy storage per volume (e.g., it may require only one quarter of the air storage capacity which would otherwise be required) and to increase the utility of the stored exhaust gas.

In automotive application, the capacitive energy storage system readily provides high peak power for good performance with a small optimum power generator and a large drive turbine, which has a very low weight to horsepower ratio. In addition, the cooled stored gas can be used to provide power for braking, jacking, operating windows, etc. without idle loss. Also, an adiabatic expansion of the stored gas can provide cooling for air conditioning without involving a separate fluid and refrigeration system.

For safety of the vehicle, the stored gas can be used to power the vehicle to remove it from a highway when the engine has failed. Further, proper sizing of the gas generator will limit the maximum safe cruising speed without loss of acceleration performance, thereby producing a safe automobile having a predetermined maximum cruising speed. Other safety features inherent in the present invention include the use of the stored gas to inflate passive restraint air bags in the event of a high speed collision. The air storage reservoir can also function as vehicle bumpers to provide low speed collision protection.

For non-automotive applications, the gas generator and capacitive energy storage systems can be used in combination wherever high transient power, in the form of clean, hot exhaust gas under pressure, is needed. Such a use is exemplified by a jet engine starter. The system of the invention could also be used in a number of indoor applications requiring pneumatic power, such as warehouse fork-lift trucks.

In a preferred embodiment, the internal combustion engine, and compressors will be operatively connected, for example, by use of a single common shaft or the use of separate shafts and sets of gears. The connected members may then be suited for rotational motion, such as a rotary internal combustion engine and compressors. Specific examples include Wankel, various sliding vane and mated screw. A combination of a single rotor Wankel internal combustion engine and two lobe sliding vane compressors is desirable because of the balance, efficiency and wide range of speed which can be attained. For added efficiency, the gas generator will supply exhaust gas to a gas turbine which can then deliver power to the gas generator system and a power output shaft. A preferred overall arrangement is that the gas generator system, the turbine and the power output shaft be associated with a differential drive system based on a partial double planetary gear system with an additional degree of freedom. However, the particular drive system utilized herein may be of the conventional type known to those skilled in the art and need not be restricted to the drive system illustrated in FIG. 2 hereof.

DESCRIPTION OF THE PREFERRED EMBODIMENTS

Figure 1:
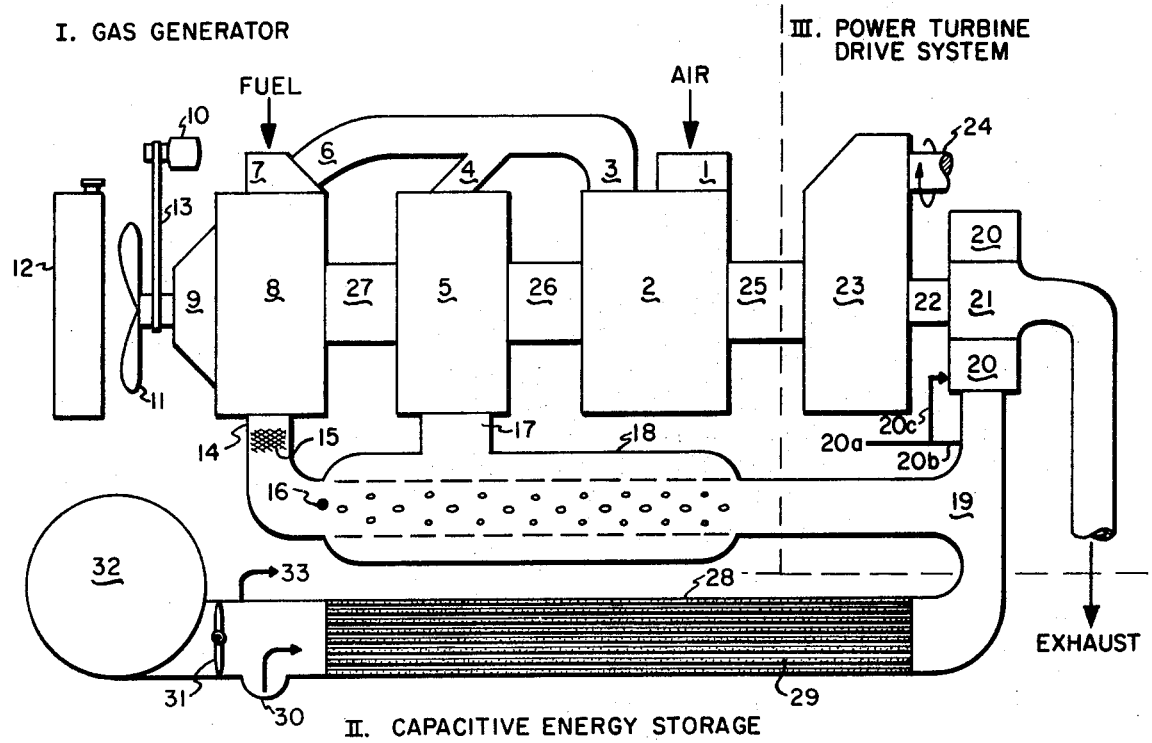
FIG. 1 is a diagramtic representation of a low polluting engine and drive system embodied by the present invention.

Referring to FIG. 1, in detail, fresh air is supplied to air cleaner-sound muffler 1 and compressed in compressor 2 to superatmospheric pressure, for example, 4 atmospheres. A portion, e.g., two-thirds of the compressed air from compressor 2 is supplied to compressor 5 via lines 3 and 4. The remaining portion of the compressed air from compressor 2 is supplied to carburetor 7 via lines 3 and 6 for mixture therein with fuel, e.g., gasoline. The compressed air delivered to compressor 5 is compressed therein so that the ratio of inlet pressure to outlet pressure preferably ranges from about 5:1 to 2:1, e.g., 3:1. An air/fuel mixture having an air-to-fuel ratio of about 10 is delivered from carburetor 7 to internal combustion engine 8 for the combustion thereof. The internal combustion engine of this particular embodiment is four-cycle and provides an effective pressure ratio between outlet and inlet of about 3:1. The combustion process in the internal combustion engine can be characterized as fuel rich, supercharged, Otto cycle, high back pressure and high internal exhaust recirculation. The exhaust from this combustion will normally have relatively high concentrations of carbon monoxide and unburned hydrocarbons but extremely low concentrations of nitrogen oxides.

Lines 3 and 6 are provided with cooling to aid the volumetric efficiency of compressor 5 and internal combustion engine 8. Cooling of line 6 should also lower the octane requirement of the gasoline delivered to the internal combustion engine. The cooling of lines 3 and 6 may be conventionally provided in a manner not shown by the combination of water pump 9, cooling fan 11 and radiator 12. Water pump 9 and fan 11 are driven by the internal combustion engine. Electric generator 10 is driven by the internal combustion engine by means of fan belt 13.

The exhaust gas from the internal combustion engine is introduced into interburner 18 by means of line 14 which contains therein nitrogen oxide reduction catalyst 15. Catalyst 15 may be a copper alloy, such as monel metal in a screen form. Compressed air from compressor 5 is introduced into interburner 18 via line 17 to effect combustion of the unburned hydrocarbons and carbon monoxide. Spark plug 16 is provided to assure the ignition of the air and combustibles in the interburner.

Interburner 18 comprises a solid tube housing a perforated tube therein, i.e., a can type. The combustibles are contained within the perforated tube and kept away from the perforated wall by compressed air which is introduced exterior to the perforated tube and enters into contact with the combustibles by passing through the perforated holes of the inner tube. Thus, since the combusting materials are kept away from the perforated wall by the entering air, no quench zone exists. In addition, the combustibles are already pre-mixed and diluted by exhaust product from the internal combustion engine, so that its mixing in the interburner is more complete and its maximum attainable local temperature is not sufficiently high to fix significant levels of nitrogen oxides. For the purposes of this example, the overall air-to-fuel ratio in the interburner will be about 30:1 or approximately twice the stoichiometric ratio.

The working gas from the interburner enters tee 19 which directs the working gas to gas turbine 21 and heat exchange/storage device 28.

The working gas from the interburner will generally be at a temperature in the range of 11,400°–1,800° F. and a pressure ranging up to about 15 atmospheres. The amount of working gas sent to gas turbine 21 is controlled by flow-regulator 20 which may be a conventional system including variable area nozzles which are used to control the flow of working gas to an impulse turbine. In this connection, such systems for controlling the delivery of power gas to a turbine are well-known and need not be described here. Thus, the energy delivered to the turbine is directly related to the opening and closing of flow regulator 20 which is shown connected to pneumatic line 20c so that flow regulator 20 is pneumatically operated by manual control line 20a which is actuated in a conventional manner by an accelerator pedal (not shown). In addition, pneumatic line 20c is also operated by pneumatic line 20b which pneumatically transmits a signal to flow regulator 20 via line 20c to close the flow regulator in the event that the pressure in tee 19 reaches a predetermined limit, thereby curtailing the operation of the turbine, air compressor and interburner so that less working gas is produced.

Mechanical shaft power is delivered by the system via shaft 24 which is driven by drive system 23 which in turn is powered by impulse turbine 21 by means of shaft 22. Drive system 23 is connected by shaft 25 to compressor 2 which in turn is connected by shaft 26 to compressor 5 which in turn is connected by shaft 27 to internal combustion engine 8. The internal combustion engine is the only part of the gas generator section which produces mechanical power. The power uses in the section include compressors 2 and 5 and other parasitic accessories, such as water pump 9, electric generator 10, and cooling fan 11. Generally, the parasitic powers used by the equipment designated by 9, 10 and 11 are in rotational form. However, there are many types of internal combustion engines and compressors. Purely oscillatory, cranked rotary and rotary types are well known. A free piston gasifier is oscillatory having a combined internal combustion engine-matched compressor unit. Under most operating conditions, internal combustion engine 8 is sufficient to power the parasitic accessory and compressor 5 but not sufficient to additionally power compressor 2. In such event, the additional mechanical power required will come from the turbine 21/drive 23 system which provides shaft power. For good emission and overall efficiency, a typical mass flow ratio among internal combustion engine 8, compressor 5 and compressor 2 is 1:2:3, respectively.

A good choice for internal combustion engine 8 is a Wankel rotary combustion engine. Its balance rotary motion, single exhaust port per chamber, smoother discharge pulse, low octane requirement, small volume per horsepower, mechanical simplicity, and degree of commercial development make it particularly useful herein. Use of properly located side inlet ports can virtually eliminate overlap. Although rotary positive displacement types of compressors may in some instances be used, the sliding vane type is a better choice for compressors 2 and 5.

Returning to the discussion of FIG. 1, the portion of the working gas in tee 19 which is not supplied to the gas turbine is directed to tube 28 containing within solid porous ceramic material 29 for contact with the working gas to remove heat therefrom. Condensed water contained in the cooled working gas is collected in condensate-aspirator 30, passed through shut-off valve 31 and into air storage tank 32. An ordinary steel pipe with adequate strength would suffice for member 28 when the peripheral portion of the ceramic material is made to serve as an integral internal insulator. Many commercially available ceramic materials can provide the necessary high heat capacity, thermal shock resistance, mechanical strength, surface to volume ratio and moisture stability. The moisture collected in condensate-aspirator 30 will evaporate during the discharge cycle when the stored working gas is delivered from gas storage tank 32 to gas turbine 21. Line 33 is provided to supply cooled working gas to the pneumatic power accessories.

For a given transient state, the direction and quantity of the gas flow in the gas storage system is dictated by the pressure difference between tee 19 and storage tank 32. The pressure at tee 13 is in turn dictated by the demand of turbine 21 and the supply of gas by the gas generator system. During peak power demands the openings of flow regulator 20 will be increased thereby supplying more energy gas to turbine 21 which in turn will supply increased power to shaft 25 to thereby deliver more power to the compressors for the production of a greater quantity of substantially pollution-free working gas. When the power demand is decreased the flow of working gas to turbine 21 will be restricted by decreasing the opening of flow regulator 20 so that a greater portion of the working gas is sent to storage tank 32 and less power is produced by turbine 21 which in turn results in a drop of power input to compressors 2 and 5, thereby resulting in a decrease of working gas delivered from interburner 18. The energy capacitance of this system thus depends on the volume of gas storage tank 32, the maximum working pressure variation of turbine 21, and the work content of the gas at tee 19.

Figure 2:
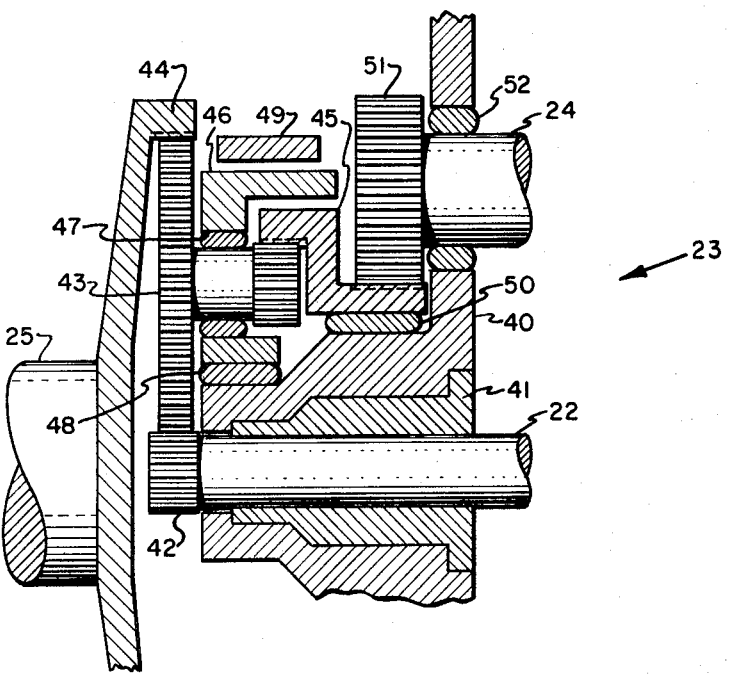
FIG. 2 is a drawing which illustrates a drive system which may optionally be utilized in the present invention.

Although the drive system which may be used with the invention may be of the conventional type, the drive system shown in FIG. 2 is particularly useful. The drive system of FIG. 2 provides inter-connection among the gas turbine shaft 22, the gas generator power system in-put shaft 25 and the power out-put shaft 24. At the same time, this system provides an additional degree of freedom. An integral wall/bearing support 40 supports turbine shaft 22 through the bearing 41. The geared end of the shaft 41, the sun gear 42, is in contact with the planetary gear 43 (only one of three is shown). This in turn is in contact with the ring gear end 44 of shaft 25 and with the inter-connecting double gear idler 45 through the smaller pinion on the opposite end. The double ended planetary gears 43 are supported by the carrier plate 46 through the bearing 47 (only one is shown). The carrier 46 is supported by wall/bearing support 40 through the bearing 48. Also, a frictional band 49 can restrain the motion of carrier 46. Idler 45 is also supported by wall/bearing support 40 through the bearing 50. The external gear of idler 45 drives the output gear 51 which is attached to out-put shaft 24 and is supported by wall/bearing support 40 through bearing 52. When the gear ratio of sun gear 42 and both ends of planetary gears 43 is fixed, the general speed relation among shafts 22, 24 and 25 can be expressed by a single equation.

This drive system provides means for turbine speed reduction, turbine starting, selection of two speeds, and regenerative braking. For starting, a brake holds shaft 24, gear 51 and idler 45 at rest. The stored gas turns shaft 22 and consequently gears 42, 43, 44 and 46, and shaft 25 must turn. This process eliminates need for a separate starter motor, and thus reduces battery size and electric generator size. When the frictional band restrains the motion of carrier plate 46 the additional degree of freedom is eliminated. This condition provides a positive connection between all three shafts. This in turn can be used to accelerate the vehicle from rest or to brake the vehicle regeneratively by transferring power from the wheels to the gas generator system. Under normal operating conditions, the rotation of carrier plate 46 can accommodate the power requirements of the gas generator system and of the drive shaft without any rigid speed relationship between them.

It is to be understood that while the invention has been presented by reference to a single embodiment chosen for purposes of illustration, numerous changes or modifications could be made within the spirit and scope of the invention and the invention is intended to be limited only by the language of the following claims.

What is claimed is:

1. In a vehicle powered by a gas turbine receiving hot gas under pressure delivered by an internal combustion engine, the improvement which comprises:
   a. an interburner connected to the internal combustion engine for receiving the exhaust gases therefrom;
   b. compressor means for delivering compressed air to said interburner to effect combustion of the unburned fuel contained in the exhaust gases received from the internal combustion engine;
   c. a gas reservoir for storing exhaust gas under pressure from said interburner and for supplying stored exhaust gas to the gas turbine for operation thereof;
   d. conduit means for delivering exhaust gas under pressure from the interburner to the gas reservoir means and the gas turbine;
   e. means for regulating the delivery of exhaust gas under pressure from the gas reservoir and the interburner to the gas turbine; and
   f. means for abstracting heat from exhaust gas supplied to the gas reservoir and for returning a substantial portion of the abstracted heat to the exhaust gas delivered from the gas reservoir to the gas turbine.

2. In a vehicle as defined in claim 1, the improvement comprising supercharger compressor means for supplying compressed air to the internal combustion engine, said supercharger compressor means powered by the gas turbine so that operation thereof may be initiated by the exhaust gas received from the gas reservoir.

3. In a vehicle as defined in claim 2, the improvement wherein the supercharger means is adapted to supply a portion of the air compressed therein to the compressor means and wherein the means for regulating the delivery of exhaust gas from the gas reservoir and the interburner is responsive to a predetermined pressure limit in the gas reservoir.

4. In a vehicle as defined in claim 3, the improvement wherein the compressor means is operatively connected to the internal combustion engine and the gas turbine so that power is derived therefrom.

5. In a vehicle as defined in claim 4, the improvement wherein the supercharger compressor means is operatively connected to the internal combustion engine and the gas turbine so that power is derived therefrom.

6. In a vehicle as defined in claim 1, the improvement wherein said means for abstracting and returning heat includes a hollow tubular member holding a supply of solid ceramic material for contact with the exhaust gas so that heat is exchanged therewith.

7. A system for supplying substantially pollution-free hot gas under pressure for use in a prime mover which comprises in combination:
   a. an internal combustion engine;
   b. fuel feed means for supplying a desired amount of fuel and air under pressure to the internal combustion engine for the supercharging thereof;

c. a first compressor means for supplying compressed air to the fuel feed means;
d. means for driving said first compressor means;
e. an interburner connected to the internal combustion engine for receiving the exhaust gases therefrom;
f. a second compressor means for delivering compressed air to said interburner to effect combustion of the unburned fuel contained in the exhaust gases received from the internal combustion engine;
g. means for driving said second compressor means;
h. a gas reservoir for storing exhaust gas under pressure from said interburner and for supplying stored exhaust gas to the prime mover;
i. conduit means for delivering exhaust gas from the interburner to the gas reservoir and the prime mover;
j. means for regulating the delivery of exhaust gas from the gas reservoir and interburner to the prime mover; and
k. means for abstracting heat from exhaust gas supplied to the gas reservoir and for returning a substantial portion of the abstracted heat to the exhaust gas delivered to the prime mover from the gas reservoir.

8. A system according to claim 7 wherein the first compressor means is adapted to supply a portion of the air compressed therein to the second compressor means and wherein said second compressor means is operatively connected to the internal combustion engine so that power is derived therefrom.

9. A system according to claim 8 wherein the prime mover includes a gas turbine which is adapted to derive power from exhaust gas stored in the gas reservoir to start the compressors and internal combustion engine.

10. A system according to claim 9 wherein the means for regulating the delivery of exhaust gas from the gas reservoir and interburner is responsive to a predetermined pressure limit in the gas reservoir.

11. A system according to claim 7 wherein said means for abstracting and returning heat includes a hollow tubular member holding a supply of solid heat exchange material for contact with the exhaust gas delivered to and from the gas reservoir.

12. A method for producing substantially pollution-free hot gas under pressure for use in a turbine-powered vehicle, which comprises:
a. combusting a fuel-rich mixture of fuel and air in an internal combustion engine to produce an exhaust gas having a low concentration of nitrogen oxides and containing unburned hydrocarbons;
b. combusting the exhaust gas in an interburner in the presence of excess air to produce a substantially pollution-free exhaust gas;
c. passing a portion of the exhaust gas from the interburner to the turbine to recover power therefrom;
d. abstracting heat from a portion of the exhaust gas from the interburner to produce cooled gas having a temperature below about 250° F.; and
e. storing the cooled gas in a gas reservoir for subsequent delivery to the turbine for the recovery of power therefrom.

13. The method of claim 12 wherein steps (d) and (e) are periodically interchanged with the steps of permitting the stored gas to flow out of the gas reservoir, returning a portion of the abstracted heat to the gas flowing from the gas reservoir and delivering the thus heated gas to the turbine for the recovery of power therefrom.

14. The method of claim 13 which includes pressurizing air in a first compressor, utilizing a portion of the pressurized air in the internal combustion engine, and further pressurizing the remaining portion of the pressurized air in a second compressor for delivery to the interburner.

15. The method of claim 14 which includes utilizing power from the internal combustion engine and the turbine to drive the first compressor and the second compressor.

16. The method of claim 15 which includes restricting the amount of exhaust gas supplied to the turbine so that the operation of the turbine, compressors and internal combustion engine is controlled thereby.

* * * * *